FIG. 12
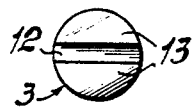
FIG. 11
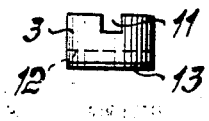
FIG. 14
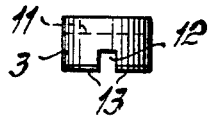
FIG. 13
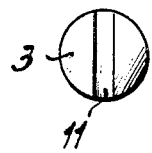
FIG. 15
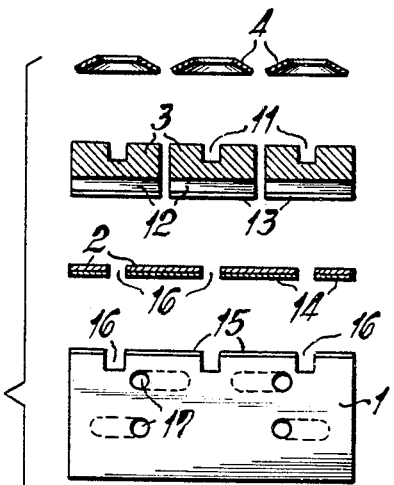
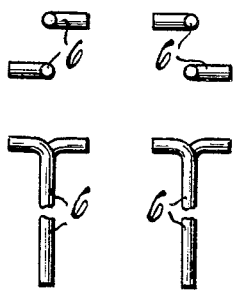

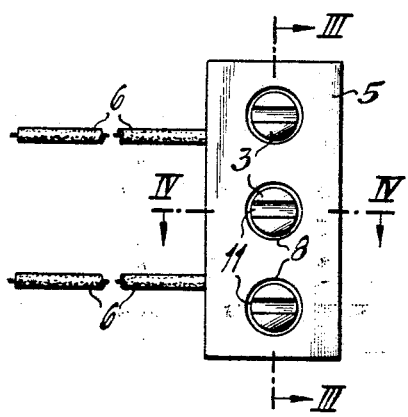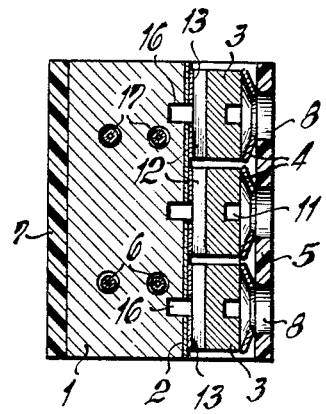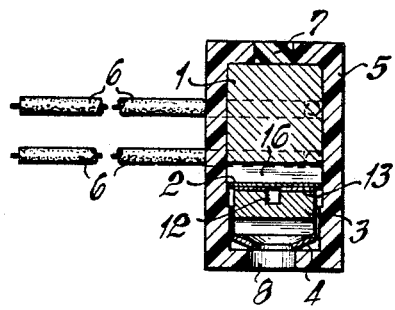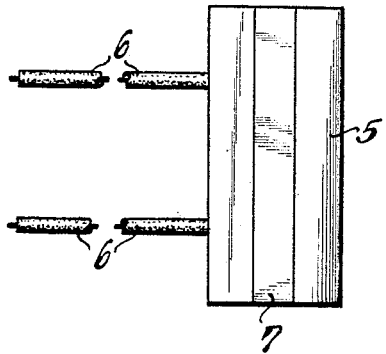

United States Patent Office 3,486,089
Patented Dec. 23, 1969

3,486,089
MINIATURE TRIMMER CONDENSER
Günther Wambach, Lauf an der Pegnitz, and Sennor Stielke, Speikern, near Lauf an der Pegnitz, Germany, assignors to Stettner & Co., Lauf an der Pegnitz, near Nuremberg, Germany, a Kommanditgesellschaft under German law
Filed Dec. 14, 1967, Ser. No. 690,515
Claims priority, application Germany, Aug. 3, 1967, St 27,209
Int. Cl. H01g 5/00
U.S. Cl. 317—249                           10 Claims

ABSTRACT OF THE DISCLOSURE

Stacked, aligned, rotor, dielectric and stator elements, all in disk shape, are completely surrounded and embraced by a housing. The housing is formed with an opening and the rotor element has a screwdriver slot beneath the opening. The housing retains the elements together, if desired with an auxiliary spring disk, and adjustment is by turning the rotor within the housing, so that a central holding shaft or pin can be eliminated and thus the structure made even smaller for comparable capacitances.

---

Figure 5:
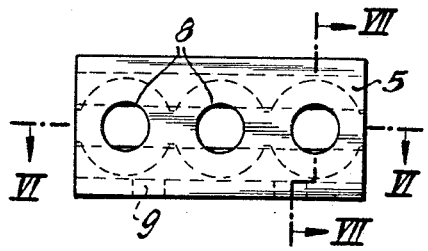

The present invention relates to a miniature trimmer condenser, and more particularly to a ceramic trimmer which can readily be assembled with similar trimmers into a plural-adjustable condenser assembly.

It is extremely difficult to manufacture miniature trimmer condensers, since the presence of the turning shaft, about which the rotor turns, sets a lower limit to size, or to maximum and minimum capacitances obtainable. Actually, as the size of the condenser is reduced, the proportionate space taken up by the turning shaft becomes greater. An example of such miniature trimmer condensers, for example have a diameter of about 5 mm. is illustrated in U.S. Patent 3,246,217.

It is an object of the present invention to provide trimmer condensers which can be made still smaller and more particularly which lend themselves to be incorporated in multiple condenser assemblies, and which have better utilization of the available space than heretofore obtainable.

Subject matter of the present invention: Briefly, in accordance with the present invention, stator and rotor, separated from each other by a dielectric disk are retained together in a housing which surrounds stator and rotor from the outside. The housing is of insulating material and retains the stator and rotor elements, and the dielectric plate, resiliently in assembled relation without any central shaft, the rotor turning within the internal surrounding surfaces of the housing with respect to the stator.

The absence of a central turning shaft enables the use of the entire cross-sectional area of the trimmer assembly to obtain a high maximum capacitance. The rotor, supplied with a plane flat electrode, is pressed against a thin dielectric disk, for example made of ceramic, having a high dielectric constant. At the opposite side of the dielectric disk, one or more pairs of electrodes are provided forming the stator. The thin dielectric disk, the surfaces of which are preferably ground to be perfectly parallel to each other, has one layer metallized thereof which may press against a base or support block to which terminals of the stator elements can be connected.

The housing itself may form the support for the entire assembly and press the parts of the assembly together. In order to increase the pressure, spring disks may be interposed. Preferably, the housing is made of an elastic material such as polystyrol, polyethylene, polyvinylchloride or the like. The housing is trough-shaped, or cup-shaped, closed at all ends and surrounds and grips one or more trimmer assemblies located in the open trough. At the wall surfaces, openings are provided for the lead-in wires. At one end surface, an opening is formed for insertion of a screwdriver, to fit into a screwdriver slot formed in the rotor element. The entire housing can be closed off by an additional plate or disk of plastic material, similar thereto, and bonded therewith after assembly of the trimmer components or elements therein.

The interior of the housing may be formed to match the trimmer assemblies located therein. The rotors are short cylindrical bodies having a screwdriver slot at the upper surface and seat in corresponding recesses of the housing, pressing with a metallized circular surface against the dielectric disk.

The materials used in the construction of the trimmer condenser according to the present invention can be ceramics or plastics well known in the condenser art. Materials having the necessary mechanical, stability and electrical characteristics are known; for details, reference may be had, for example to the chapter on Materials of the Standard Handbook for Electrical Engineers (McGraw-Hill Brook Company) and specifically to the section on Insulating Materials. Characteristics of such materials can be determined from appropriate current ASA Standards, for example ASA Standards C75.1, C75.2, and C75.4. Further reference can be had to the aforementioned U.S. Patent 3,246,217 assigned to the assignee of the present invention.

Figure 6:
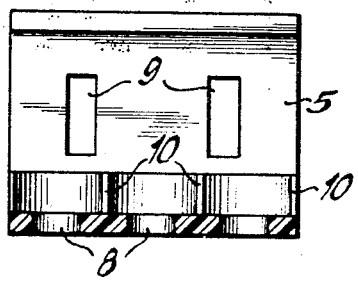
Figure 7:
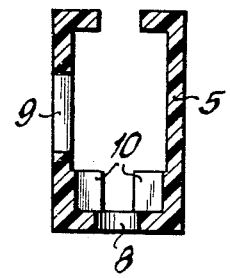
Figure 8:
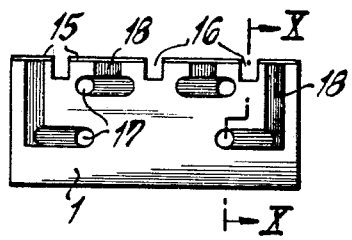
Figure 9:
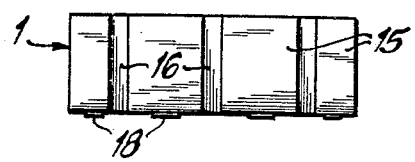
Figure 10:
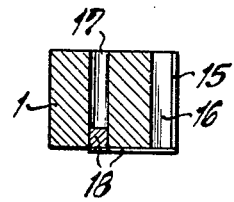

The structure, organization, and operation of the invention will now be described more specifically with reference to the accompanying drawing which illustrates the embodiments of the invention greatly enlarged and wherein:

FIG. 1 is a triple-trimmer condenser in accordance with the present invention, in 5-fold enlargement, and seen from the top;
FIG. 2 is the trimmer of FIG. 1 from below;
FIG. 3 is a section along line III—III of FIG. 1;
FIG. 4 is a section along line IV—IV of FIG. 1;
FIG. 5 is a top view of the housing;
FIG. 6 is a section along line VI—VI of FIG. 5;
FIG. 7 is a section along line VII—VII of FIG. 5, but illustrating the housing in open condition;
FIG. 8 is a front view of the stator block;
FIG. 9 is a top view of the stator block;
FIG. 10 is a section along line X—X of FIG. 8;
FIG. 11 is a front view of the rotor looking along the screwdriver slot;
FIG. 12 is a bottom view of the rotor;
FIG. 13 is a top view of the rotor;
FIG. 14 is a side view of the rotor, turned 90 degrees with respect to FIG. 11; and
FIG. 15 illustrates the parts, in exploded view, forming a triple-trimmer assembly, without the housing.

Referring now to the drawings: A housing 5, consisting of plastic, and best seen separately in FIGS. 5–7, is of sufficient size to include three trimmer assemblies therein. The housing 5 is trough-shaped, that is, in cross-section it has a general U-shape with ridges surrounding the top side in order to grip the trimmer assemblies therein. At the closed, bottom part of the U, or the bottom of the trough, three openings 8 are formed therein in order to permit insertion of a screwdriver to engage a rotor placed beneath the openings. Small separating and holding flaps 10, in the upper portion of the housing, separate and insulate the trimmers from each other. Lead-in wire openings 9 are provided for the condenser leads 6. After assembly of the trimmers into the housing, a plastic strip 7 (see particularly FIG. 4) is placed at the open end of the U (or the open side of the trough) and bonded therein, for example by adhesives or plastic welding.

Three rotors 3, formed of steatite have semi-circular metal coatings 13 placed thereon, separated from each other by a diametrical gap or slit 12 (see FIGS. 12 and 14). A screwdriver slot 11, to permit engagement by a screwdriver or similar adjustment to, is formed in the top part of the rotor disk 3.

The three rotors are separated from each other by the intermediate walls or flaps 10, and are prevented from lateral movement thereby. A dielectric disk 2 is located beneath the rotors 3. Dielectric disk 2 consists of a commercial ceramic material having a dielectric constant of about 55. It is ground to have plane and parallel surfaces and, on one side, is formed with a conductive metallized layer, such as a silver layer 14.

A base block 1 is located beneath the dielectric disk 2. Base block 1 has a metallized surface 15 at its upper side, which engages the metallized layer 14 of the dielectric disk 2. The metallized surface 15 is subdivided by gaps or slots 16 into various metallized regions, thus sub-dividing the metal layer 14, 15, which may be termed the stator layer 15 generally, into separate portions. These portions may be completely associated with the rotor 3 of any one trimmer or may be common to two or more of the trimmers.

The rotors are held resiliently against the stators by the inherent resiliency of the material of the housing. Additionally, if desired, tiny disk springs 4 can be placed in the assembly (see particularly FIG. 4) to further press the rotor 3 against the common stator block 1, so that the rotor metallized layers 13 are opposite the metallized layers 15 of the stator elements, as formed and defined by the gaps 16.

The stator block may also be formed of steatite, or may be of porcelain, or even of plastic. The rotor preferably consists of ceramic, which is both readily metallized and further has a very low expansion. The choice of materials depends in any case on the designer and on the desired temperature coefficients and dielectric constants. As an example, materials are available having the following dielectric constants and temperature coefficients.

| Dielectric constant: | Temperature coefficient |
| --- | --- |
| 6.5 | $+100 \cdot 10^{-6}$ |
| 22 | $-33 \cdot 10^{-6}$ |
| 53–60 | $-470 \cdot 10^{-6}$ |
| 90 | $-750 \cdot 10^{-6}$ |

Any one of the elements, rotor or stator, may also be entirely of metal, or of plastic with a metallized layer; the dielectric disk 2 may be of metallized plastic.

The stator layers 14, 15 are connected by means of silver conductors 18, passing through cross bores 17 within the block, for further connection to connecting wires or terminals 6 (see particularly FIGS. 8 and 15). In a preferred form, the so-called differential circuit is used which is particularly illustrated and described in FIGS. 1–6 as well as 13–14 of the above-identified Patent 3,246,217. This has the advantage that no connections need be made to the movable rotor. Stator layers 14, 15 are electrically connected with the source of current, and the capacity is varied by placing more, or less of the metallized rotor layer over both stator portions. This connection, by and in itself, is well known. The form of stator layers 14, 15, and its connections with wires 6, a connection layer 18, and the location of bores 17 is illustrated in FIGS. 3, 4, 8, 9 and 10–15.

The principle of the present invention may also be used in connection with trimmer condensers as particularly illustrated and described in FIGS. 7–12 and 15–16 in the above-identified U.S. Patent 3,246,217. This requires that the rotor has a wiper contact; on the other hand, only one connection is necessary to the stator.

Single trimmer condensers can, of course, be built in accordance with the present invention; or more than three trimmers can be incorporated in a single housing. The housing can also be extended for incorporation therein of tiny coils to form, together with the condensers, tuned circuits, which coils can be connected directly to the metallized layers forming the stator.

The present invention thus provides a subminiature trimmer assembly, providing efficient utilization of available space since no turning shaft or axis is necessary, the rotor element being rotatably retained within the housing such that the circumference of the rotor element bears the interior of the housing, to be held in alignment thereby with the stator elements.

The dielectric for an assembly of a group of condensers may consist either of separate dielectric disks, as best seen in FIG. 15; or may consist of a plate common to a plurality of trimmer assemblies, as best seen in FIG. 3. Since the rotor element is rotatably retained by the interior walls of the housing, for centerless rotation, no space or bearing need be formed in the dielectric, or the opposing stator block.

What is claimed is:

1. Miniature trimmer condenser comprising a stator element having an electrically conductive, flat face;
a disk-shaped insulating element having opposed, parallel, flat faces;
a circular disk-shaped rotor element having an electrically conductive, flat face adjacent said insulating disk element and being formed with engagement means at the other face thereof;
and a housing of insulating material surrounding all said elements and resiliently retaining said elements in stacked assembly and the flat faces thereof pressed against each other, said housing movably retaining said rotor elements and fixedly retaining said other elements and being formed with an opening providing access to said engagement means of the rotor for adjustment thereof.

2. Trimmer condenser as claimed in claim 1, wherein said housing forms a resilient trough-shaped retaining body, enclosing in its free space a plurality of stacked assemblies and being formed in its base with a plurality of openings providing access to the engagement means of the several stacked assemblies, respectively;
and a strip of plastic material bonded to the open side of said trough-shaped housing to close said housing and seal said assembly therein.

3. Trimmer condenser as claimed in claim 2, including lead-in connections connected to at least one of said elements, said lead-in connections passing through a wall of said trough-shaped housing.

4. Trimmer condenser as claimed in claim 1, wherein said rotor element is a cylindrical disk of insulating material having a metallized layer at a flat face thereof, said layer being split into two halves by a diametrical gap; and said stator member is a metallized layer formed at the face of said insulating element remote from the face contacting the rotor element split into two halves by a diametrical gap.

5. Trimmer condenser as claimed in claim 4 wherein said stator element is a metallized layer formed at the face of said insulating element remote from the face contacting the rotor element; and a connection block is provided located within said housing, said connection block having conductive regions on its face engaging the connecting layer on the insulating element, and conductor means leading through said housing and engaging said connection block.

6. Multiple trimmer assembly comprising a plurality of trimmers as claimed in claim 1, said housing being common to all said trimmers; said housing being formed with internal separating walls to movably retain said rotor elements and separate and insulate said rotor elements from each other.

7. Assembly as claimed in claim 6, said insulating element being common to all said trimmers; said insulating element being metallized at a face remote from that bearing against the rotor elements and sub-divided by gaps to form the stator elements, said stator elements being arranged opposite the rotor elements of said trimmers.

8. Assembly as claimed in claim 6, including a connection block of insulating material common to all said trimmers and having regions of metallization formed thereon; and lead wires connected to said regions.

9. Miniaturized trimmer assembly comprising stacked, aligned circular disk-shaped rotor, dielectric, and stator elements, each having flat, parallel faces;

said stator element being a metallized layer on said dielectric element applied to the face of the dielectric element remote from the face directed toward the rotor element;

said disk-shaped rotor element having a flat conductive face adjacent said dielectric element and having engagement means formed on the other face thereof;

and a housing entirely surrounding all said elements from the outside to retain said elements in aligned and stacked relation, said housing being formed with an externally accessible opening adjacent the engagement means of said rotor element to permit rotation of said rotor element with the housing and thereby adjustment of the trimmer.

10. Trimmer assembly as claimed in claim 9 wherein said conductive face on the rotor is a metallized layer split diametrically; said stator is a metallized layer on the dielectric element split diametrically; and connection means are provided separately connected to the diametrically split portions of said layer on the dielectric element, said connection means extending through openings formed in the side of the housing.

References Cited

UNITED STATES PATENTS

| | | |
|---|---|---|
| 2,475,144 | 7/1949 | Kodama. |
| 3,131,338 | 4/1964 | Howell. |
| 3,246,217 | 4/1966 | Wambach. |

ELLIOT A. GOLDBERG, Primary Examiner